April 18, 1950  J. G. DAVIS ET AL  2,504,110
APPARATUS FOR AND METHOD OF TOASTING FOODSTUFFS
Filed Aug. 28, 1945  3 Sheets-Sheet 1
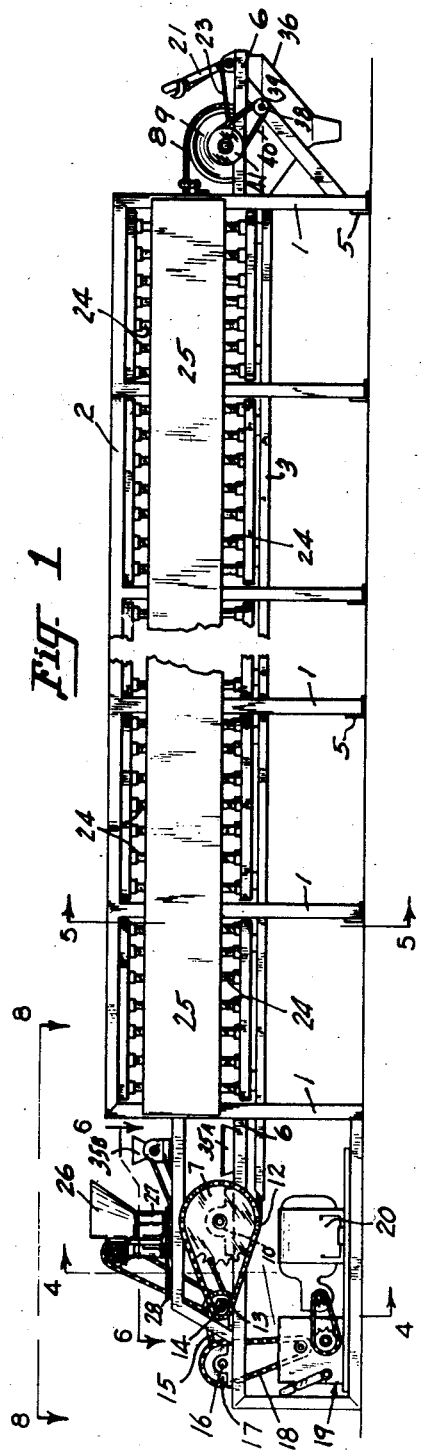
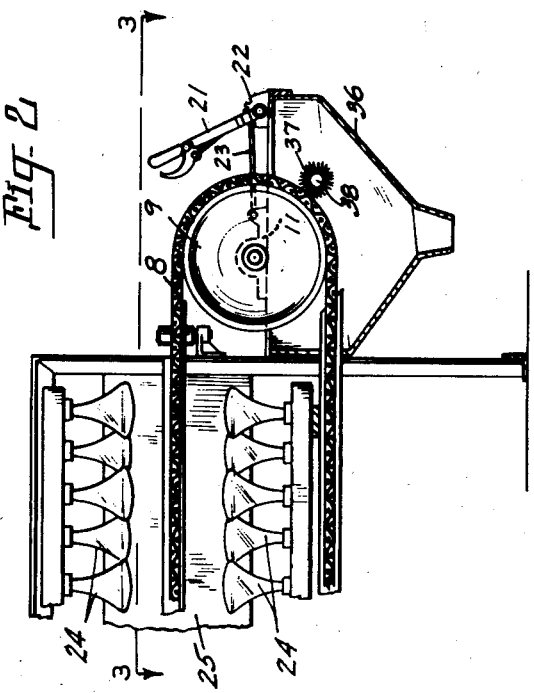
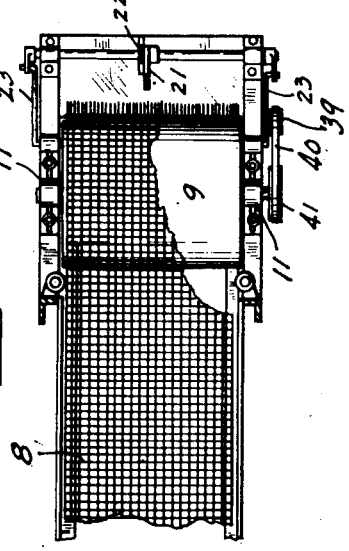
INVENTORS
JOHN G. DAVIS
CARL JACOBSEN
ATT'Y

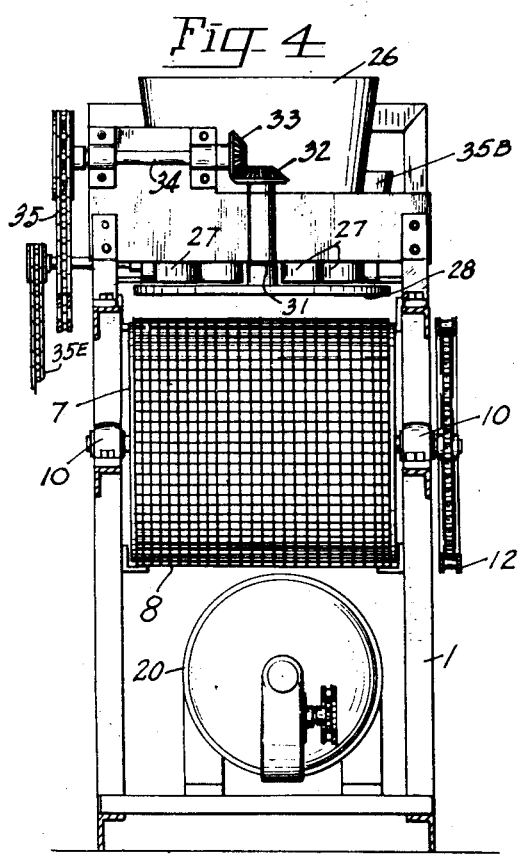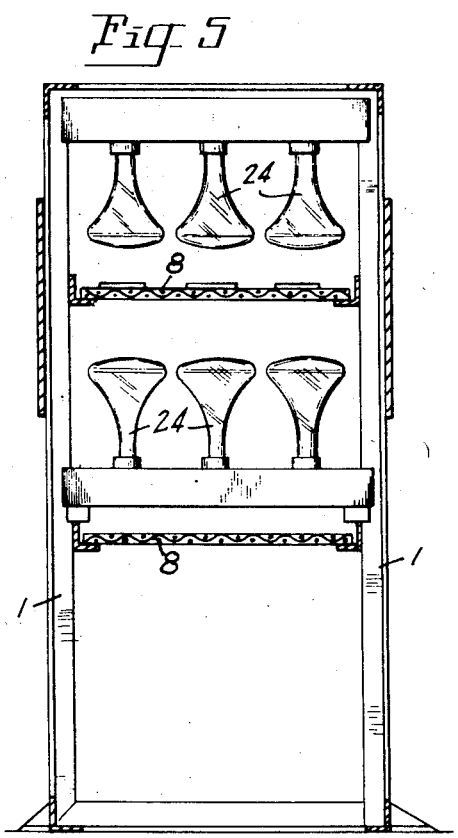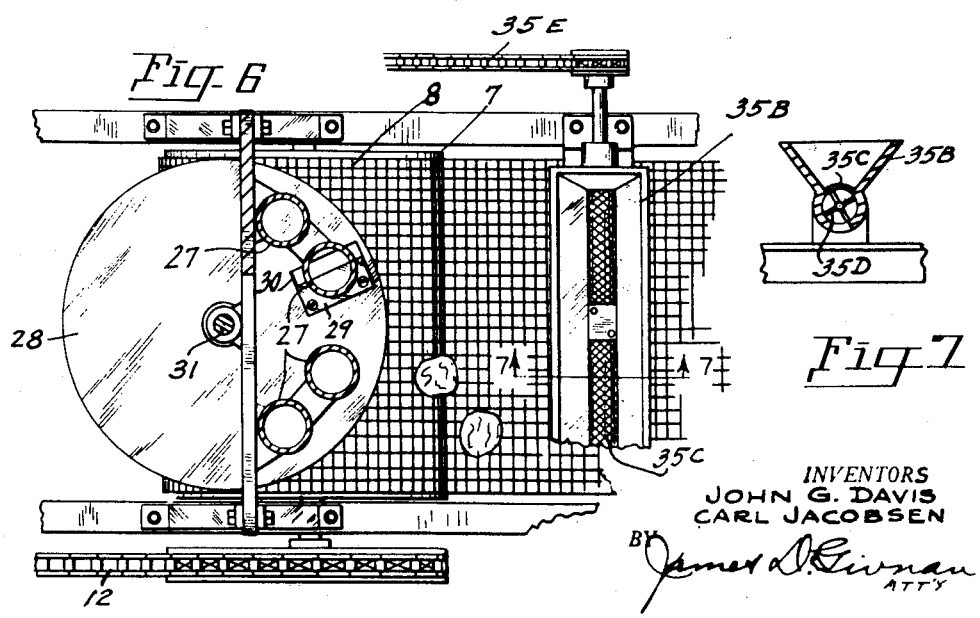

April 18, 1950   J. G. DAVIS ET AL   2,504,110
APPARATUS FOR AND METHOD OF TOASTING FOODSTUFFS
Filed Aug. 28, 1945   3 Sheets-Sheet 3

JOHN G. DAVIS
CARL JACOBSEN
INVENTORS

BY James D. Girnard
ATTORNEY

Patented Apr. 18, 1950

2,504,110

UNITED STATES PATENT OFFICE 2,504,110

APPARATUS FOR AND METHOD OF TOASTING FOODSTUFFS

John G. Davis and Carl Jacobsen, Portland, Oreg.

Application August 28, 1945, Serial No. 613,188

1 Claim. (Cl. 99—386)

This invention relates to improvements in food making apparatus and more especially to apparatus adapted for the production of potato chips.

Heretofore, this commodity was made by dropping thin slices of potatoes into cooking oil, fats, or the like, for a predetermined length of time and thereafter applying a suitable quantity of salt. Potato chips produced in this manner are distorted into various shapes and consequently take up considerable room in packaging, etc. Moreover, chips made as aforesaid are unpleasant to handle because of the cooking oil and salt adhering to the fingers of the consumer.

Accordingly, it is one of the principal objects of our invention to provide apparatus of this character in which potato chips are produced in a rapid and efficient manner by a toasting process in which no cooking oil, or the like, is used. The salt is applied to the chips immediately after they have been sliced from the potato so that the inherent moisture of the chip will cause the salt to cling to it.

A further object of the invention is to provide means for regulating the speed of production and hence the degree to which the chips are toasted. The salt is applied by means of an automatic mechanism, which also constitutes one of the objects of the invention.

A still further object is the provision of new and novel hopper-fed slicing means for cutting the chips in uniform thickness and depositing them on a conveyer in equally spaced rows and at uniform distances between each chip in each of said rows. The speed of the slicer is also variable to accommodate an increase or decrease in the speed of production.

These and other objects will appear as our invention is more fully hereinafter described in the following specification, illustrated in the accompanying drawings, and finally pointed out in the appended claim.

In the drawings:

Figure 1 is a side elevation of a food making machine made in accordance with our invention.

Figure 2 is an enlarged fragmentary sectional side elevation of the right-hand end of Figure 1.

Figure 3 is a sectional top plan view taken on the line 3—3 of Figure 2.

Figure 4 is an enlarged sectional end view of Figure 1 taken on the line 4—4 therein.

Figure 5 is an enlarged sectional end view taken on the line 5—5 of Figure 1.

Figure 6 is an enlarged fragmentary sectional plan view taken on the line 6—6 of Figure 1.

Figure 7 is a sectional view taken on the line 7—7 of Figure 6.

Figure 9:
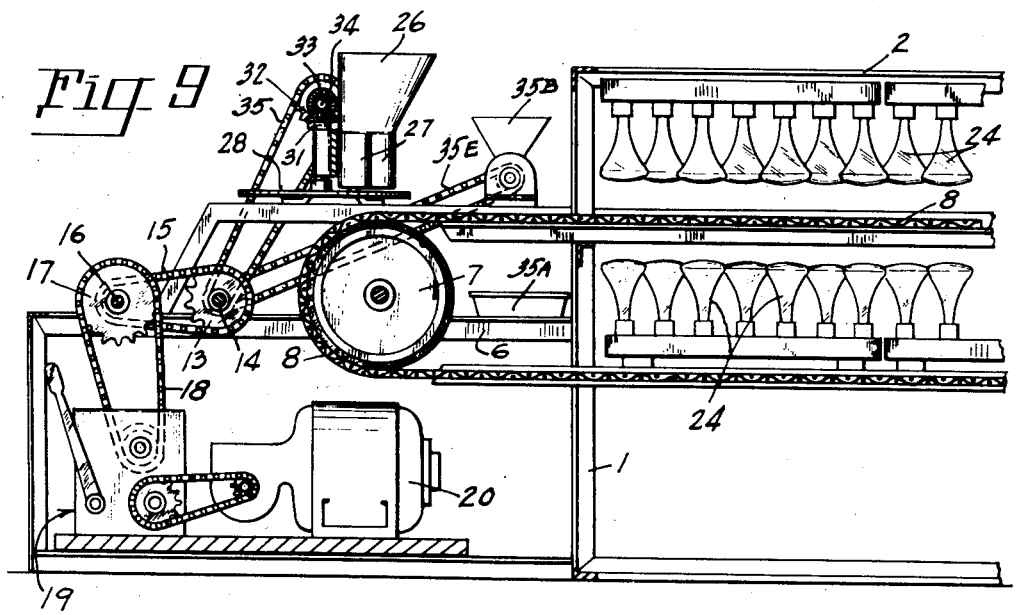
Figure 9 is a sectional side elevation taken on the line 9—9 of Figure 8.

Referring now more particularly to the drawings:

The framework of our apparatus consists of a number of vertical uprights 1, secured at their upper ends to longitudinal members 2, and intermediate their ends to a lower horizontal member 3. The leg portions of the uprights are interconnected by transverse members 5, or, if desired, they may be attached to a base or additional longitudinal members. In addition to the longitudinal members just described, we provide longitudinal members 6 to form a support at one end for a drum 7, embraced by an endless conveyer 8, preferably made of wire mesh, screening, or the like, and embracing at its opposite end a companion drum 9. Both drums are mounted in suitable bearings 10 and 11 respectively, which are mounted upon the longitudinal members 6. The conveyer is driven by a sprocket chain 12, embracing and driven by a sprocket wheel 13 secured to a shaft 14, which in turn is driven by a chain 15 around a sprocket wheel carried by a shaft 16, to which is secured a sprocket wheel 17 driven by the chain 18 which is driven by the power take-off of a gear reduction means generally indicated at 19. The gear reduction means is driven by a motor 20, and its speed may be increased or decreased in the conventional manner to speed up or slow down production of the finished chips.

At the opposite end of the framework, we provide a take-up mechanism for applying tension to the conveyer belt. The take-up consists of a lever 21 pivotally mounted to a ratchet 22 and connected by a link 23 to the movable bearing 11 for the drum 9.

Disposed above and below the top run of the conveyer are a plurality of infra-red lamps 24 all electrically connected through a single switch with any convenient source of electrical supply. The lamps, of course, are mounted in sockets in the usual manner extending downwardly and upwardly from the longitudinal members as shown. Along each side of the framework we attach heat deflecting plates 25 for concentrating the heat on the upper run of the conveyer. The width of the plates may be determined by the number of lamps used and the speed of travel of the conveyer with respect to the lamps.

Figure 8:
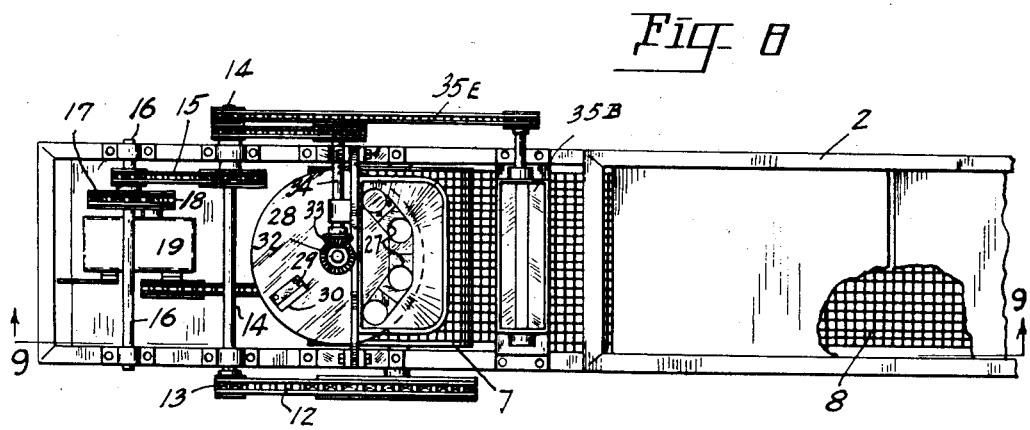
Figure 8 is an enlarged fragmentary top plan view as viewed along the line 8—8 of Figure 1.
Figure 10:
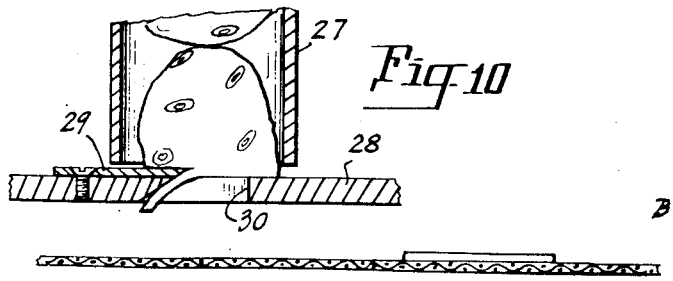
Figure 10 is an enlarged sectional detail view showing our cutter blade in the process of slicing a potato as it moves downwardly from the hopper.

Directly above the starting end of the conveyer, or above the drum 7, we mount a hopper 26 terminating at its lower end in a plurality of vertical tubes 27 adapted to feed potatoes one at a time downwardly into wiping contact with a rotatable disc 28 in the path of movement of a cutting blade 29 attached to the disc. The blade is disposed at the trailing edge of an elongated aperture 30 formed through the disc so that the sliced potatoes will drop through the aperture and onto the upper run of the conveyer. As best illustrated in Figures 4, 8 and 9, the disc 28 is rotated by a shaft 31, whose upper end is provided with a bevelled gear 32 meshing with a companion gear 33 attached to a shaft 34 driven by a sprocket chain 35 which is driven by the shaft 14.

Forwardly of the hopper and cutting mechanism, we provide means in the form of an agitator for dropping salt onto the freshly sliced potato chips before they enter the heating area. The salt clings to the moist surface of the chips and the surplus salt drops through the screened conveyer and is collected in a pan 35A. The agitator (see Figs. 6, 7 and 9) consists of an elongated hopper 35B having a convex screen 35C extending along its open bottom and beneath which and in pressureless contact with the screen is a rotatable agitator 35D driven by its shaft, which is driven by the sprocket chain 35E and shaft 14.

At the discharge end of the apparatus we provide a hopper 36 to receive the finished chips as they drop from the upper run of the conveyer. To facilitate removing any of the chips that might adhere to the conveyer, we provide a rotary brush 37 mounted upon a shaft 38, which is driven by a pulley 39, belt 40 and pulley 41, which is driven by the shaft of the drum 9. The brush is held in light brushing contact with the conveyer so as not to injure or mutilate the finished chips. From the lower or open end of the hopper 36 the chips may be deposited into containers such as cartons, bags and the like, or they may be delivered from the hopper by any suitable form of conveyer or suction pipes, or the like, to other points of distribution or handling.

Although we have described the use of the apparatus for the production of potato chips, it is to be understood that the apparatus is equally wall adaptable for dealing with various other edibles.

While we have shown a particular form of embodiment of our invention, we are aware that many minor changes therein will readily suggest themselves to others skilled in the art without departing from the spirit and scope of the invention.

Having thus described our invention, what we claim as new and desire to protect by Letters Patent is:

Apparatus of the character described comprising an elongated frame, an endless conveyer of open mesh material extending entirely through the frame and outwardly from both ends thereof, heat generating lamps disposed above and below the top run of the conveyer in sockets carried by the frame, heat ray reflecting means in the form of a vertically disposed plate attached to each side of the frame and extending full length thereof, each of said plates being of less height than the distance between the sockets of said upper and lower lamps, and means for actuating said conveyer operable from the exterior of said frame.

JOHN G. DAVIS.
CARL JACOBSEN.

REFERENCES CITED

The following references are of record in the file of this patent:

UNITED STATES PATENTS

| Number | Name | Date |
|---|---|---|
| 1,131,299 | Vaudreuil | Mar. 9, 1915 |
| 1,252,613 | Phelps | Jan. 8, 1918 |
| 1,443,242 | Roth | Jan. 23, 1923 |
| 1,486,351 | Malone | Mar. 11, 1924 |
| 1,530,387 | Marra | Mar. 17, 1925 |
| 1,531,256 | Morrow | Mar. 24, 1925 |
| 1,666,335 | Lentz | Apr. 17, 1928 |
| 1,696,613 | Shroyer | Dec. 25, 1928 |
| 1,716,266 | Flamm | June 4, 1929 |
| 1,717,926 | Horowitz | June 18, 1929 |
| 1,776,781 | Corpenter | Sept. 30, 1930 |
| 2,056,845 | Ferry | Oct. 6, 1936 |
| 2,101,506 | Morrow et al. | Dec. 7, 1937 |
| 2,182,229 | Hamel | Dec. 5, 1939 |
| 2,339,974 | Austin | Jan. 25, 1944 |